Patented Mar. 2, 1954

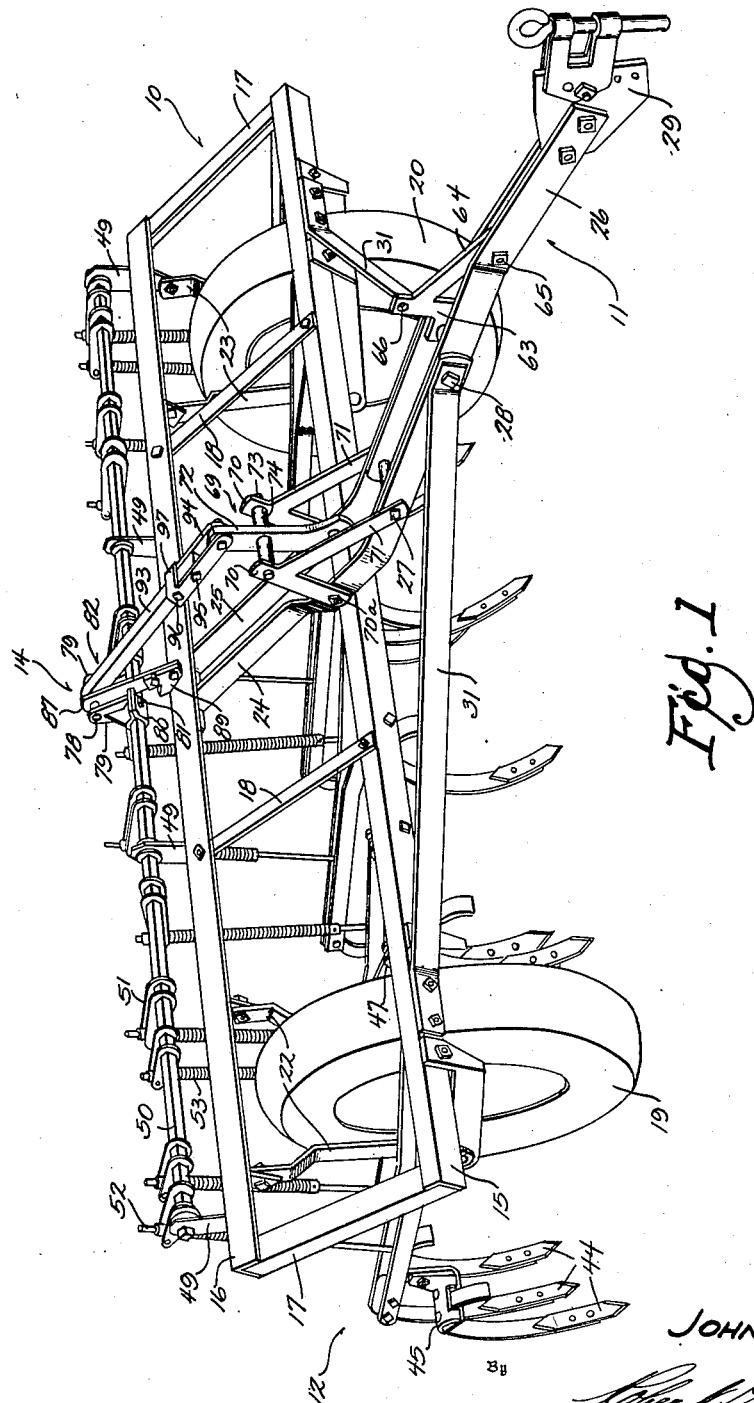

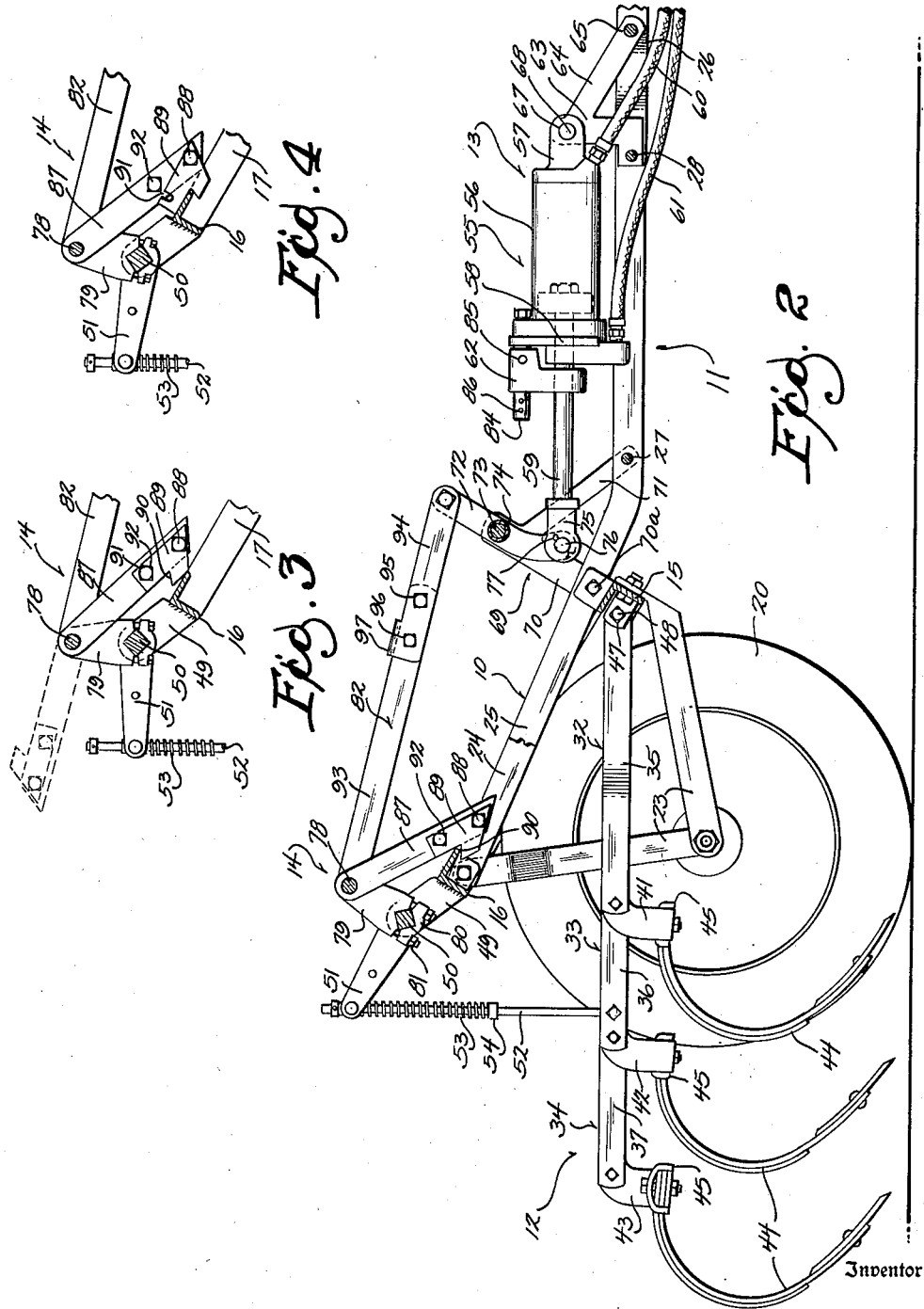

2,670,672

UNITED STATES PATENT OFFICE 2,670,672

FIELD TILLER

John M. Markel, Rockford, Ill., assignor to J. I. Case Company, Racine, Wis., a corporation of Wisconsin Application December 6, 1950, Serial No. 199,500

3 Claims. (Cl. 97—46.31)

This invention relates to improvements in the construction and operation of field cultivators of the type having a plurality of cultivator rigs mounted adjacent one another on the frame of the machine and in such a manner that a strip of ground the width of the machine may be cultivated by means of earth working tools mounted on the cultivator rigs.

It is therefore an object of the present invention to improve the operation and construction of devices of this class.

It is a further object of this invention to provide a pressure operated means operable from a tractor or other suitable propelling means for moving the earth-working tools of an implement that is trailingly connected to the tractor from an operative to a transport position.

It is a further object of this invention to provide a mechanical latch for holding the earth-working tools in transport position for permitting the removal of the pressure operated means for use on other applications about the farm.

Still a further object is to provide mechanism whereby the pressure operated means can be mounted on the implement when the implement is latched in a raised position regardless of whether the pressure operated means is fully extended, partially extended, or fully retracted.

Another object is to provide a mechanical latch having releasable means for raising the same when the force exerted thereupon reaches a predetermined value.

Other objects and advantages will appear in the following description of a preferred embodiment of the invention as illustrated in the accompanying drawings in which:

Fig. 1 is a perspective view of a field tiller embodying the present invention, with parts removed, taken from in front and toward the right side of the machine.

Fig. 2 is a right-side sectional elevation of the machine illustrated in Fig. 1 showing the cultivator rigs raised and locked in transport position.

Fig. 3 is a right-side sectional elevation of certain details shown in Fig. 2 showing the latch mechanism in an unlatched condition.

Fig. 4 is a view similar to Fig. 3 showing the safety feature of the latch mechanism.

Referring now to Figs. 1 and 2 of the drawings it will be seen that the field cultivator construction chosen to illustrate the principles of the present invention comprises a transversely disposed rectangular frame 10, a draft means 11 which extends forwardly of the frame 10, cultivator rigs 12 which are movably mounted on the frame 10, a pressure operated means 13 for raising and lowering the rigs 12, and a latch means 14 for locking or suspending the rigs 12 in a transport or non-working position for permitting removal of the pressure operated means 13.

The rectangular frame 10 comprises front and rear transverse angle members 15 and 16 which are secured together in spaced relationship by longitudinal end angle members 17 and intermediate longitudinal angle members 18. The frame 10 is normally positioned in a forwardly and downwardly inclined position and movably supported in this position by means of transport wheels 19 and 20, the wheels 19 and 20 being rotatably supported with respect to the frame 10 by pairs of angular shaped wheel hangers or brackets 22 and 23 respectively.

A suitable draft means 11 extends forwardly from the frame 10 and comprises a pair of forwardly extending members 24 and 25 suitably secured rearwardly to the members 15 and 16 of the frame 10 and a bifurcated member 26 secured to the members 24 and 25 by means of bolts or other suitable means 27 and 28. The bifurcated member 26 has the usual connection 29 adjacent the forward end thereof for attachment with a tractor or other suitable propelling means for trailingly positioning the implement behind the tractor. A pair of members 31, which are connected adjacent their rear end to the angle member 15 near the lateral ends thereof, converge forwardly, and are secured adjacent their forward ends by means of the bolt 28 for bracing the member 26 and the members 24 and 25.

The cultivator rigs 12 are pivotally mounted on the frame 10 and comprises a plurality of short rigs 32, a plurality of intermediate rigs 33, and a plurality of long rigs 34. The rigs 32, 33 and 34 comprise drawbars 35, 36 and 37 respectively which are held in spaced relation adjacent their forward ends. The rear ends of the drawbars converge and substantially vertical tool standards 41, 42 and 43 respectively are connected thereto. Cultivator shovels or tools, in the form of spring teeth 44 in the present instance, are secured to the ends of the tool standards 41, 42 and 43 by means of tool clamps 45 of any well known or suitable construction and are positioned in earth engaging relationship with respect to the ground. The drawbars 35, 36 and 37 all extend to the same width, as well known in the art, which is desirable for increasing the torsional rigidity of the rigs and for the ready connection of the rigs to the frame. The rigs are connected to brackets 47 which are connected to the angle member 15 of the frame 10. The brackets are mounted in pairs in equally spaced relation along the member 16 and the drawbars 35, 36 and 37 are pivotally connected between a pair of the brackets 47 by transverse bolts or the like 48.

The cultivator rigs are raised or lowered by means of the pressure operated lifting means 13 carried by the frame 10 and operative from the operator's station on the tractor. From the rear of the frame 10 extends a plurality of spaced brackets 49 for rotatably supporting a rock shaft 50 in parallel relationship with respect to the transverse angle member 16. Lifting arms 51 are secured to the rock shaft 50 in alignment with each of the cultivator rigs 32, 33 and 34, and a link 52 connects the lifting arm 51 and the rigs 12. A spring 53 encircles each link 52 and is compressed against a collar 54 for serving as a pressing means for the respective rigs 32, 33 and 34 as well known in the art.

The pressure operated lifting means 13 includes in the present instance a hydraulic cylinder 55 of any well known type generally associated with farm tractors and implements and has a cylindrical body 56 closed at one end by a head 57 and at the other end by a head 58, a plunger or piston and rod 59 slidable in the cylindrical body, fluid or pressure hoses or conduits 60 and 61 opening into opposite ends of the cylindrical body and connected to the hydraulic pressure source of the tractor, and a limit stop 62. The cylinder is supported forwardly by means of a standard 63 which is secured between the members 24 and 25 and the bifurcated member 26 by means of bolt 28 and braced against rotative movement by means of a member 64 secured forwardly to the bifurcated member 26 by means of a bolt or the like 65. An opening 66 is formed in the standard and an opening 67 is formed in the head 57 of the cylinder for reception of a pin 68 when the openings are in alignment thereby supporting one end of the cylinder 55.

Rearwardly a standard 69 having substantially parallel members 70 is secured by means of bolts or the like 70ª to the forwardly extending members 24 and 25 adjacent the transverse member 15 and is braced by means of members 71 so as to position the standard substantially normal to the inclined plane of the frame 10, the members 71 being secured forwardly by means of bolt 27. A rocking beam 72 is pivotally carried between the members 70 by means of a pivot 73 for rocking substantially in a fore-and-aft direction and is prevented from moving axially on the pivot by means of spacer sleeves 74. One end of the rocking beam 72 is connectable to a clevis 75 on the piston rod 59 by means of a pin 76 and a lock pin or cotter 77. The other end of the rocking beam 72 is connected to a pivot 78, carried between parallel and adjacent lift arms 79, which are non-rotatably fixed to the rock shaft 50 by means of a suitable clamp 80 and bolts 81, by means of a link 82 so that upon actuation of the cylinder 55 the rocking beam 72 will be rocked in one direction for turning the rock shaft.

To more specifically describe the operation of the lifting means suppose that the tools are positioned for working the ground and that the operator desired to position the tools in transport position. The operator therefore by manipulation of well known hydraulic controls positioned on the tractor near the operator's station increases the pressure forwardly of the piston by way of hose 60 and releases the pressure rearwardly of the piston by way of hose 61 so as to expand or extend the piston rod 59. Upon extension of the piston rod 59, the rocking beam 72 is rocked in a clockwise direction, Fig. 2, which in turn pulls upon link 82 and consequently rocks the rock shaft 50 in a clockwise direction, for lifting the rigs 12 into a transport position. When it is desired to lower the cultivator rigs 12, the pressure in the hydraulic cylinder upon further manipulation of the hydraulic controls on the tractor is reduced in the front of the piston through hose 60 while the pressure in the rear of the piston is increased by pressure from the hose 61 thereby retracting the piston rod 59 into the cylindrical body 56. As the piston retracts, the rock shaft is forced in a counterclockwise direction by the weight of the cultivator rigs 12. This counterclockwise movement of the rock shaft is limited only by the resistance of the hydraulic cylinder exerted on the rocking beam 72. When the cultivator rigs are lowered so that the earth working tools rest upon the ground, the ground supports the weight of the rigs and the piston can be further retracted as already described, thereby moving the rocking beam 72 counterclockwise and forcing the tools into the earth the desired distance.

It will be apparent that an exceedingly convenient means has been provided for raising and lowering the cultivator rigs. Various well known hydraulic controls are contemplated as adaptable for the construction, some of which give accurate control of the position of the piston within the cylindrical portion 56. With such devices the depth of cultivating is readily controlled by merely manipulating the hydraulic controls on the tractor so as to hold the piston in the position necessary to maintain the cultivating depth. Other hydraulic systems operate in such a manner as to move the piston to the limit of its travel in one direction or the other. This type of system is equally adaptable, an example being seen in Fig. 2.

The above mentioned limit stop 62 is slidable on a rod 84 fixed in relation to the head 58 and may be locked in various positions thereon by means of a pin 85 engaged therewith and with one or the other of holes 86 formed in the rod 84. Clevis 75, upon movement forwardly, will encounter stop 62 after predetermined movement, the amount of movement being determined by the position selected for stop 62. As will be apparent, various positions of stop 62 will result in various positions of rocking beam 72 when the clevis 75 is against the stop 62 and this will result in various positions of the tools with respect to the ground. Since the cultivating depth is dependent upon the position of the rock shaft and consequently upon the position of the rocking beam 72, any selected cultivating depth can be reached immediately by simply actuating the hydraulic mechanism to bring the clevis 75 against the stop 62 in whatever position has been selected for the latter. It will be appreciated that the cultivating depth will consequently always be the same and no attention need be paid the rigs 12 when lowering them into working position.

The latch means 14 is provided for mechanically holding the rigs 12 in raised or transport position for permitting the removal of the hydraulic cylinder 55 for use on other applications about the frame as previously suggested. The latch means includes, in the present instance, a latch 87 pivotally secured in the present instance to the pivot 73 adjacent the link 82 for substantially fore-and-aft swinging movement (see also Figs. 3 and 4). Adjacent the other end of the latch 87 is pivotally secured by means of a bolt or other suitable means 88, a latch stop 89 provided with a lip 90 for being pressed or abutted against the rear transverse member 16 when the rigs 12 are held in transport position as will be explained presently. The latch stop 89 is provided in the present instance with a slot or slipway 91 which is accommodated by a bolt 92 secured to the latch 87 so as to hold the latch stop longitudinally adjacent the latch 87.

During operation of the tiller, the latch stop 87 is swung rearwardly, dotted lines in Fig. 3, so as to be out of the way or out of contact with the rear transverse frame member 16 when the rigs 12 are raised or lowered in normal use. If the operator decides to place the machine in storage or transport the machine with the cylinder 55 removed therefrom, he has merely to swing the latch 87 forwardly so that the latch stop 89 is in frictional contact with the frame member 16, raise the rigs 12 until the lip 90 of the latch stop 89 falls into place with respect to the undersurface of the frame member 16, and then allow the rigs 12 to bias the rock shaft 50 counterclockwise until the lip 90 of the latch stop 89 comes in contact with the frame member 16. The force exerted by the weight of the rigs 12 and their accompanying earth working tools tending to bias the rock shaft counterclockwise is sufficient to retain the latch stop 89 pressed against the frame member 16 but not sufficient to release or pivot the latch stop about the bolt 88 through the slot or slipway 91 from the bolt 92. With the rock shaft held thus against rotation, the hydraulic cylinder can be removed and the tiller transported or placed in storage. To place the tiller into an operative condition requires merely that the cylinder 55 be secured between the rocking beam 72 and the standard 63 as previously described. The cylinder should then be expanded so as to rotate the rock shaft sufficiently in a clockwise direction to release the tension exerted on the latch stop 89. The latch 87 is then swung rearwardly so as to be out of the way of the frame member 16 during subsequent movement of the rigs 12. If the operator attempts to lower the rigs 12 immediately without first releasing the tension exerted on the latch stop 89 and then swinging the latch 87 rearwardly, the latch stop 89 will release through the slipway 91 from the latch 87 and the bolt 92 so as to be pivoted downwardly and consequently be released from the member 16 without any damage being done, the force exerted by the cylinder 55 plus the force exerted by the weight of the cultivator rigs 12 tending to bias the rock shaft 50 counterclockwise being sufficient to overcome the force exerted by the bolt 92 tending to prevent pivotal movement of the latch stop 89 about bolt 88.

For permitting the hydraulic cylinder 55 to be connected between the rocking beam 72 and the standard 63 in an extended, partially extended, or fully retracted condition, the link 82 is formed, in the present instance of members 93 and 94 pivotally connected by means of a bolt or other suitable means 95 and held in rigid longitudinal alignment by means of a removable pin or the like 96 it being recognized that the relationship between the members 93 and 94 is that of a toggle-joint. The member 94 in the present instance is provided with a stop 97 which upon removal of the pin 96 abuts against the member 93 for preventing downward buckling of the members 93 and 94 while permitting the members 93 and 94 to buckle upwardly so that the member 94 can be swung in a clockwise direction, Fig. 2. In operation the cylinder 55 is connected to the standard 63 by means of pin 68 in a manner already described. The operator then by supporting the cylinder 55 with one hand can remove the pin 96 with his other hand and swing the member 94 in a clockwise direction about the bolt 95 so as to buckle the members 93 and 94 upwardly. Swinging movement of the member 94 in a clockwise direction will initiate swinging movement of the rocking beam 72 in a counterclockwise direction, the amount of swinging movement initiated to the rocking beam depending upon whether the cylinder is retracted, partially extended, or fully extended. With the rocking beam thus free to swing in a counterclockwise direction the operator therefore swings the rocking beam sufficiently to allow the pin 76 to secure the clevis 75 thereto. Then upon extension of the rod 59 by means of the hydraulic controls on the tractor in a manner as already described, the rocking beam 72 is swung in a clockwise direction which in turn moves the member 94 in a counterclockwise direction so as to buckle the toggle-joint downwardly, until the stop 97 abuts against the member 93. With the members 93 and 94 thereby in longitudinal alignment, the pin 96 can be reinserted and the member 94 is in locked longitudinal relationship with respect to member 93.

While in the foregoing there has been shown and described the preferred embodiment of this invention, it is to be understood that minor changes in the details of construction and combination and arrangement of parts may be resorted to without departing from the spirit and scope of the invention as claimed.

I claim:

1. In an implement having a main frame supported for movement and adapted to be drawn by a propelling means, a rock shaft rotatably carried by said main frame, cultivating rigs pivotally secured to the frame and connected with said rock shaft for upward movement when said rock shaft is rotated in one direction, a lift arm on said rock shaft, a rocking beam for rotation about an axis substantially transverse to the direction of travel of the implement, a pressure operated cylinder removably pivoted to said implement in actuating relationship to one end of said rocking beam, a toggle joint having one member pivotally connected to said lift arm and the other member pivotally connected to the other end of said rocking beam, a stop on one of said members for preventing buckling of said toggle joint in one position, and removable means for locking said members in such position.

2. In an implement having a main frame supported for movement and adapted to be drawn by a propelling means, a rock shaft rotatably carried by said main frame, cultivating rigs pivotally secured to the frame and connected with said rock shaft for upward movement when said rock shaft is rotated in one direction, a lift arm on said rock shaft, a rocking beam for rotation about an axis substantially transverse to the direction of travel of the implement, a pressure operated cylinder removably pivoted to said implement and in actuating relationship to one end of said rocking beam, a toggle-joint having one member pivotally connected to said lift arm and the other member pivotally connected to the other end of said rocking beam, a stop on one of said members for preventing buckling of said toggle-joint in one direction when the members are in substantially longitudinal alignment, and removable means for locking said members in longitudinal alignment.

3. In an implement having a main frame supported for movement and adapted to be drawn by propelling means, a rock shaft rotatably carried by said main frame, tool supporting rigs connected to the frame and to the rock shaft for upward movement when said rock shaft is rotated in one direction, a lift arm on said rock shaft, a rocking beam for rotation about an axis substantially transverse to the direction of travel of the implement, a hydraulic cylinder removably pivoted to said implement and in actuating relationship to one end of said rocking beam, a toggle-joint having one member pivotally connected to said lift arm and the other member pivotally connected to the end of said rocking beam, a stop on said other member for preventing buckling of said toggle-joint downwardly when the members are in substantially longitudinal alignment, and a removable pin for locking said members in longitudinal alignment.

JOHN M. MARKEL.

References Cited in the file of this patent

UNITED STATES PATENTS

| Number | Name | Date |
|---|---|---|
| 1,755,808 | Brown | Apr. 22, 1930 |
| 1,846,457 | Robinson | Feb. 23, 1932 |
| 2,319,458 | Hornish | May 18, 1943 |
| 2,319,492 | Dewey | May 18, 1943 |
| 2,324,840 | Hipple | July 20, 1943 |
| 2,332,741 | Mott | Oct. 26, 1943 |
| 2,458,091 | Moore | Jan. 4, 1949 |
| 2,532,577 | Silver et al. | Dec. 5, 1950 |
| 2,580,100 | Johansen et al. | Dec. 25, 1951 |
| 2,605,686 | Starr | Aug. 5, 1952 |

FOREIGN PATENTS

| Number | Country | Date |
|---|---|---|
| 30,088 | Sweden | Jan. 7, 1911 |